(12) United States Patent
Kim (10) Patent No.: US 7,174,719 B2
(45) Date of Patent: Feb. 13, 2007

(54) GAS TURBINE ENGINE WITH SEAL ASSEMBLY

(75) Inventor: Kyung-heui Kim, Changwon-si (KR)

(73) Assignee: Samsung Techwin Co., Ltd. (KR)

( * ) Notice: Subject to any disclaimer, the term of this patent is extended or adjusted under 35 U.S.C. 154(b) by 237 days.

(21) Appl. No.: 10/983,117

(22) Filed: Nov. 5, 2004

(65) Prior Publication Data

US 2006/0010880 A1    Jan. 19, 2006

(30) Foreign Application Priority Data

Jul. 16, 2004    (KR) .................... 10-2004-0055481

(51) Int. Cl.
*F02C 7/24* (2006.01)
*F02C 7/28* (2006.01)

(52) U.S. Cl. .................... 60/805; 415/174.3; 415/177; 417/373

(58) Field of Classification Search .................. 60/805; 415/170.1, 174.3, 177, 178; 417/373
See application file for complete search history.

(56) References Cited

U.S. PATENT DOCUMENTS

| | | | | |
|---|---|---|---|---|
| 3,263,424 A | * | 8/1966 | Birmann | 60/799 |
| 3,661,477 A | * | 5/1972 | Westrum | 417/373 |
| 5,074,111 A | * | 12/1991 | Harris et al. | 60/39.37 |
| 5,161,945 A | | 11/1992 | Clevenger et al. | 415/177 |
| 5,233,824 A | | 8/1993 | Clevenger | 60/39.75 |

* cited by examiner

*Primary Examiner*—L. J. Casaregola
(74) *Attorney, Agent, or Firm*—Tuchman & Park LLC

(57) ABSTRACT

A gas turbine engine includes an interstage seal assembly positioned in a plenum between the compressor section and turbine section. The seal assembly includes an annular seal member positioned in the plenum adjacent to the compressor section for restraining a fluid flow between the compressor section and the turbine section, and an annular heat shield member positioned in the plenum adjacent to the turbine section for limiting heat transfer from the turbine section to the compressor section. The annular heat shield member includes a plurality of slots formed on a surface of the heat shield member in a radial direction of the annular heat shield member.

11 Claims, 8 Drawing Sheets

GAS TURBINE ENGINE WITH SEAL ASSEMBLY

This application claims the priority of Korean Patent Application No. 2004-55481, filed on Jul. 16, 2004, in the Korean Intellectual Property Office, the disclosure of which is incorporated herein by reference in its entirety.

BACKGROUND OF THE INVENTION

1. Field of the Invention

The present invention relates to a gas turbine engine with a seal assembly, and more particularly, to a gas turbine engine having an interstage seal assembly which includes a heat shield member for restraining heat transfer from the high-temperature turbine section to the low-temperature compressor section of the engine and a seal member for limiting the fluid flow between the compressor section and the turbine section.

2. Description of the Related Art

A gas turbine engine refers typically to a type of turbine engine that operates in a Brayton cycle, one of the ideal and basic thermodynamic cycles, and continuously obtains power through compression and subsequent expansion processes of a gaseous working fluid. The gas turbine engine generally requires a small amount of lubricating oil, and enables high-speed driving, and can be small-sized and highly integrated. For these advantages, the gas turbine engine is often used for a power unit for an aircraft and also increasingly applied to ships and industrial equipments. In recent years, the gas turbine engine has been employed in a turbo charger for supplying compressed air, for example, to fuel cell vehicles.

Figure 1:
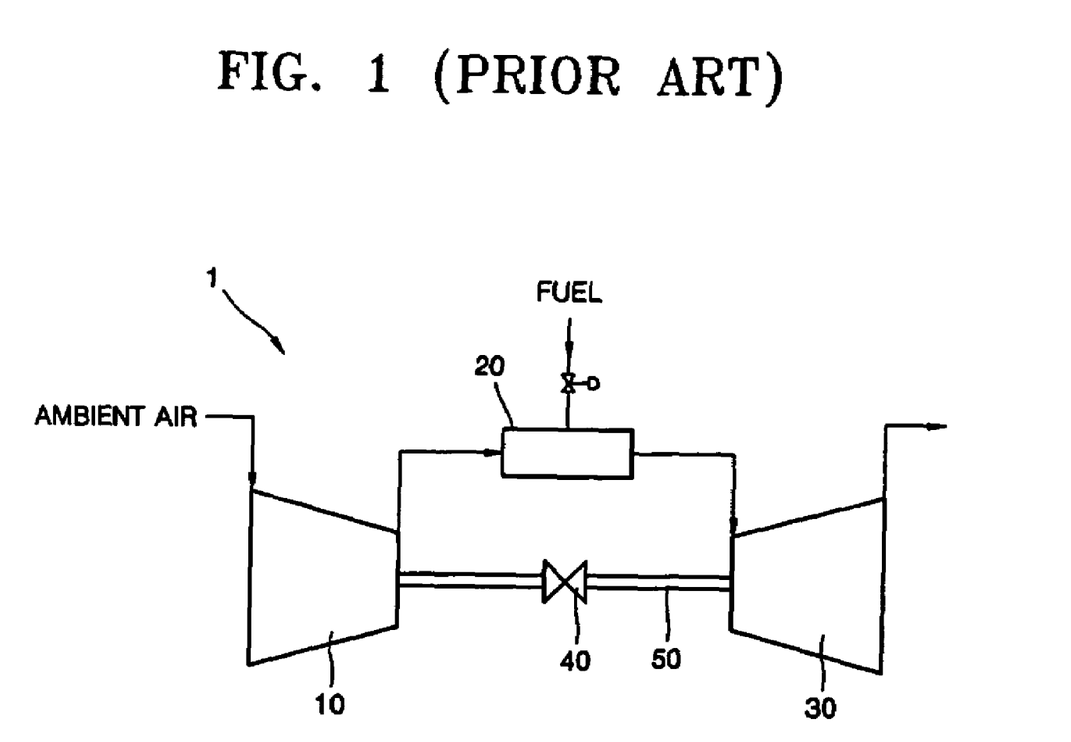
FIG. 1 is a schematic diagram of a conventional gas turbine engine, which illustrates the flow of ambient air and a combustion gas in the gas turbine engine.

FIG. 1 is a schematic diagram of a conventional gas turbine engine with arrows indicating a direction of air flow in the gas turbine engine.

Referring to FIG. 1, a compressor section 10 of gas turbine engine 1 ingests ambient air, compresses the air, and delivers the compressed air to a combustor section 20. A flow of fuel is supplied to the compressed air in the combustor section 20. Combustion of the fuel maintained within the combustor section 20 provides a flow of high-temperature combustion gas. The high-temperature combustion gas flows to a turbine section 30 wherein it expands and discharges axially to produce power. The turbine section 30 drives a rotor shaft 50, and simultaneously drives the compressor section 10 which is in turn connected to the shaft 50.

Generally, in the gas turbine engine 1, the compressor section 10 and the turbine section 30 are closely located opposing each other so as to minimize the size of the engine. Between the turbine section 30 and the compressor section 10, a seal assembly 40 is disposed to prevent a direct flow of compressed air from the compressor section 10 to the turbine section 30 and also to shield heat transfer from the high-temperature turbine section 30 to the low-temperature compressor section 10.

Figure 2:
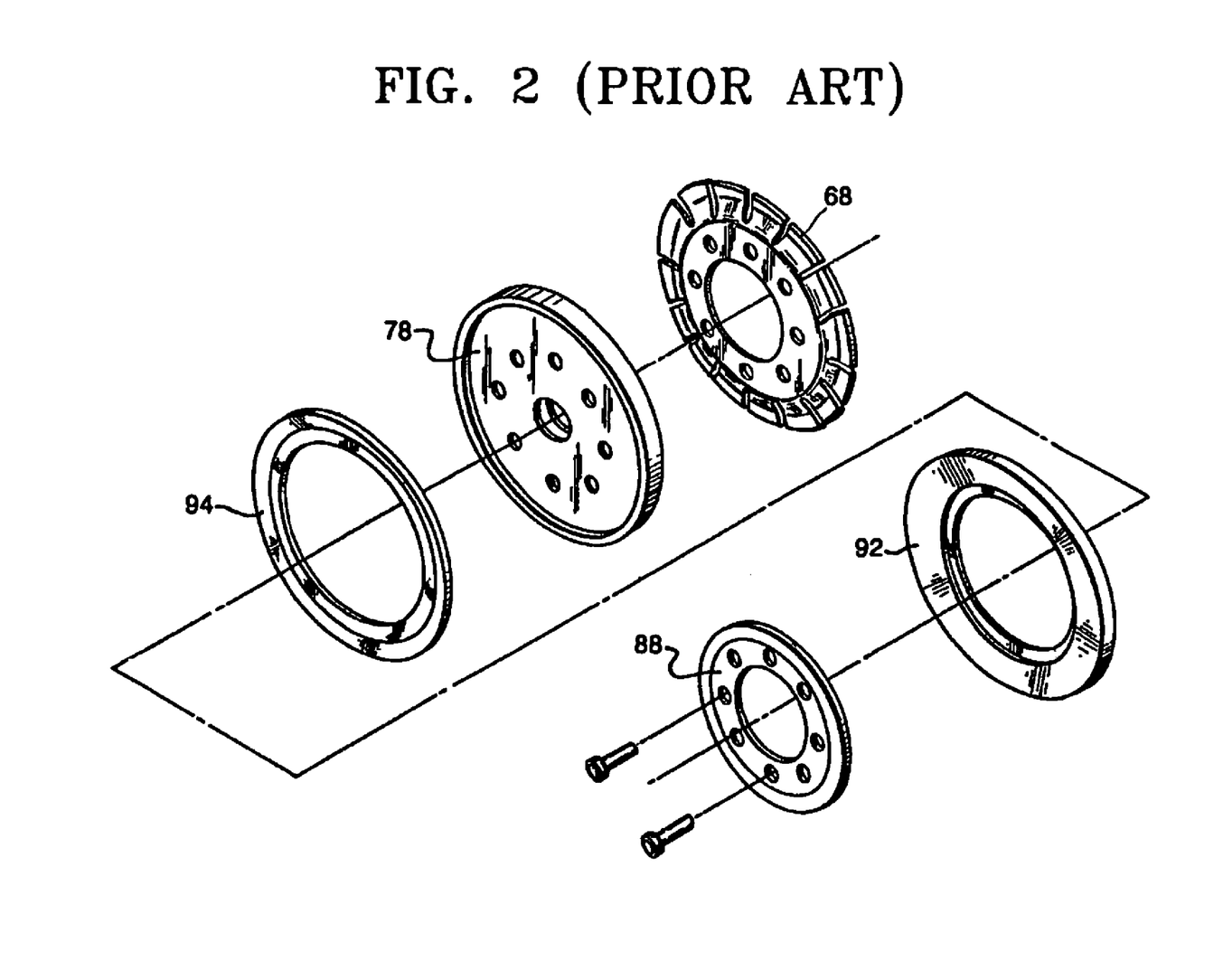
FIG. 2 is an exploded view of a conventional seal assembly.

An example of such a seal assembly is disclosed in U.S. Pat. No. 5,161,945 assigned to Allied Signal Inc., New Jersey. The seal assembly of this disclosure includes a spring member, a seal member, a heat shield member, a shroud member, and a bracket member, which are sequentially assembled. As disclosed in FIG. 6 of U.S. Pat. No. 5,161,945, the seal assembly includes an annulus formed from a large body of honeycomb material to resist thermal and pressure stresses thereon. In particular, to prevent the seal assembly from being damaged due to high-temperature combustion gases flowing from a turbine section, the heat shield member is installed to face the turbine section of the seal assembly. With reference to FIG. 2 (which is FIG. 8 in U.S. Pat. No. 5,161,945), the heat shield member 92 has a form of an annular plate. However, since a portion of the heat shield member contacting the high-temperature combustion gases has a flat plate shape, a serious thermal buckling can be occurred from a prolonged use of the engine, particularly, by repeatedly exposing to a sharp change in the temperature during the transition operation cycles of the gas turbine engine, thus reducing the life span thereof.

SUMMARY OF THE INVENTION

The present invention is directed to a seal assembly for a gas turbine engine, and a gas turbine incorporating the seal assembly therein. The seal assembly includes a seal member and a heat shield member configured to restrain the fluid flow between a compressor section and a turbine section and also to limit heat transfer from the turbine section to the compressor section. The seal assembly can also resist thermal stresses on the heat shield member which exposes to the hot combustion gases flowing from the turbine section.

According to one aspect of the present invention, a gas turbine engine comprises: a turbine section having a turbine rotor; a compressor section having a compressor rotor and positioned in a proximity of the turbine section; a plenum disposed between the turbine section and the compressor section, the plenum having first and second fluid paths adjacent to an outermost tip of the compressor rotor and the turbine rotor, respectively; and, a seal assembly positioned in the plenum. The seal assembly of the gas turbine engine comprises: an annular seal member positioned in the plenum adjacent to the compressor section for restraining a fluid flow between the compressor section and the turbine section via the first fluid path of the plenum; and, an annular heat shield member positioned in the plenum adjacent to the turbine section for limiting heat transfer from the turbine section to the compressor section via the second fluid path of the plenum, the annular heat shield member including a plurality of slots formed on a surface of the heat shield member, the slots disposed in a radial direction of the annular heat shield member.

The seal assembly preferably includes an elastic member positioned between the seal member and the heat shield member to bias the heat shield member to a turbine section housing of the gas turbine engine.

According to another aspect of the present invention, a seal assembly is provided for a gas turbine engine, the seal assembly adapted to place in a plenum disposed between a turbine section and a compressor section of the gas turbine engine for restraining a fluid flow between the turbine section and the compressor section. The seal assembly comprises: a seal member formed with a plate in a generally annular shape; and, a heat shield member formed with a heat-resistant plate in a generally annular shape, an inner portion of the heat shield member being attached to an inner portion of the seal member, and an outer portion of the heat shield member being spaced apart from an outer portion of the seal member, the heat shield member including a plurality of slots formed therein, the slots arranged in a radial direction of the heat shield member.

According to another aspect of the present invention, a heat shield member for a seal assembly of a gas turbine engine is provided, which is formed in a generally annular shape, and includes a plurality of slots formed on a surface of the heat shield member wherein the slots is disposed at intervals in a radial direction of the heat shield member. A through hole is preferably formed in at least one end portion of each of the slots. Each of the slots preferably extends from a portion adjacent to the outermost portion of the heat shield member to a portion adjacent to the innermost portion of the annular heat shield member. The slots are preferably arranged at regular intervals along the annular heat shield member. The shield member is preferably formed of a heat-resistant metal plate.

According to the present invention, the heat shield member and the sealing assembly can reduce damage from thermal stresses in the area contacting the high-temperature gases flowing from the turbine section, and can extend the life of the seal assembly and the engine.

BRIEF DESCRIPTION OF DRAWINGS

The above-mentioned features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

According to one embodiment of the invention, a turbo charger 100 is described herein as one example of a gas turbine engine, which incorporates the seal assembly of the invention. However, the present invention is not limited to the turbo charge, and generally applicable to any suitable type of gas turbine engines.

Figure 3:
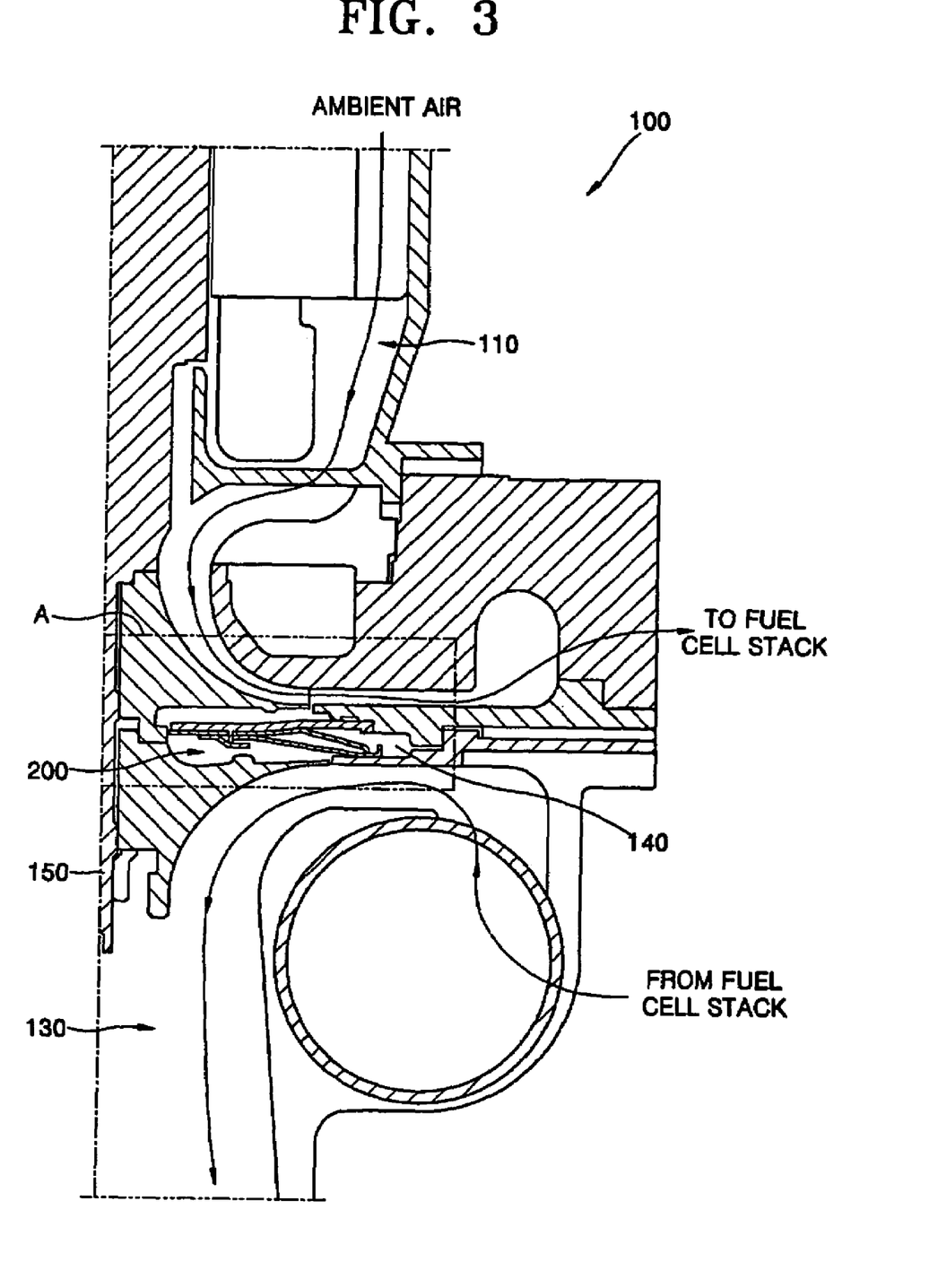
FIG. 3 is a partial, longitudinal sectional view of a turbo charger showing a part of the right-half portion of the turbo charger which includes the seal assembly according to one embodiment of the present invention, which also illustrates the flow of ambient air and a combustion gas.

Referring to FIG. 3, the turbo charger 100 includes a seal assembly 200 constructed according to the principles of the invention. The turbo charger 100 includes a turbine section 130 and a compressor section 110. The turbine section 130 drives a rotating shaft by high-temperature compressed gases. The compressor section 110 is coaxially coupled to the turbine section 130 with a shaft 150, and compresses ambient air by the driving force of the turbine section 130. The compressor section 110 and the turbine section 130 are disposed adjacent to each other in an opposing manner and back-to-back relation to each other, and an annular plenum 140 is interposed therebetween. Since the compressor section 110 is a centrifugal type and the turbine section 130 is a radial type, the air supplied to the compressor section 110 in a generally axial direction is radially discharged. The high-temperature compressed gases supplied to the turbine section 130 in a radial direction are, then, axially discharged out of the turbine section 130. However, it is particularly noted that the present invention is not limited to the compressor section and the turbine section having the same or similar construction as particularly described above.

If the turbo charger 100 is a type for using as an air supplier for a fuel cell system, the compressed gases flowing from the compressor section 110 flow to a fuel cell stack (not shown), and high-temperature compressed gases flowing from the fuel cell stack flow to the turbine section 130, as illustrated in FIG. 3.

In the turbo charge 100, the compressor section 110 and the turbine section 130 are located in a close proximity to each other. Thus, if some of the air compressed by the compressor section 110 does not flow toward the required place (such as the fuel cell tack) but directly flows to the turbine section 130 through the plenum 140, the efficiency of the turbine section 130 becomes lowered and the performance of the entire engine is degraded.

Figure 4:
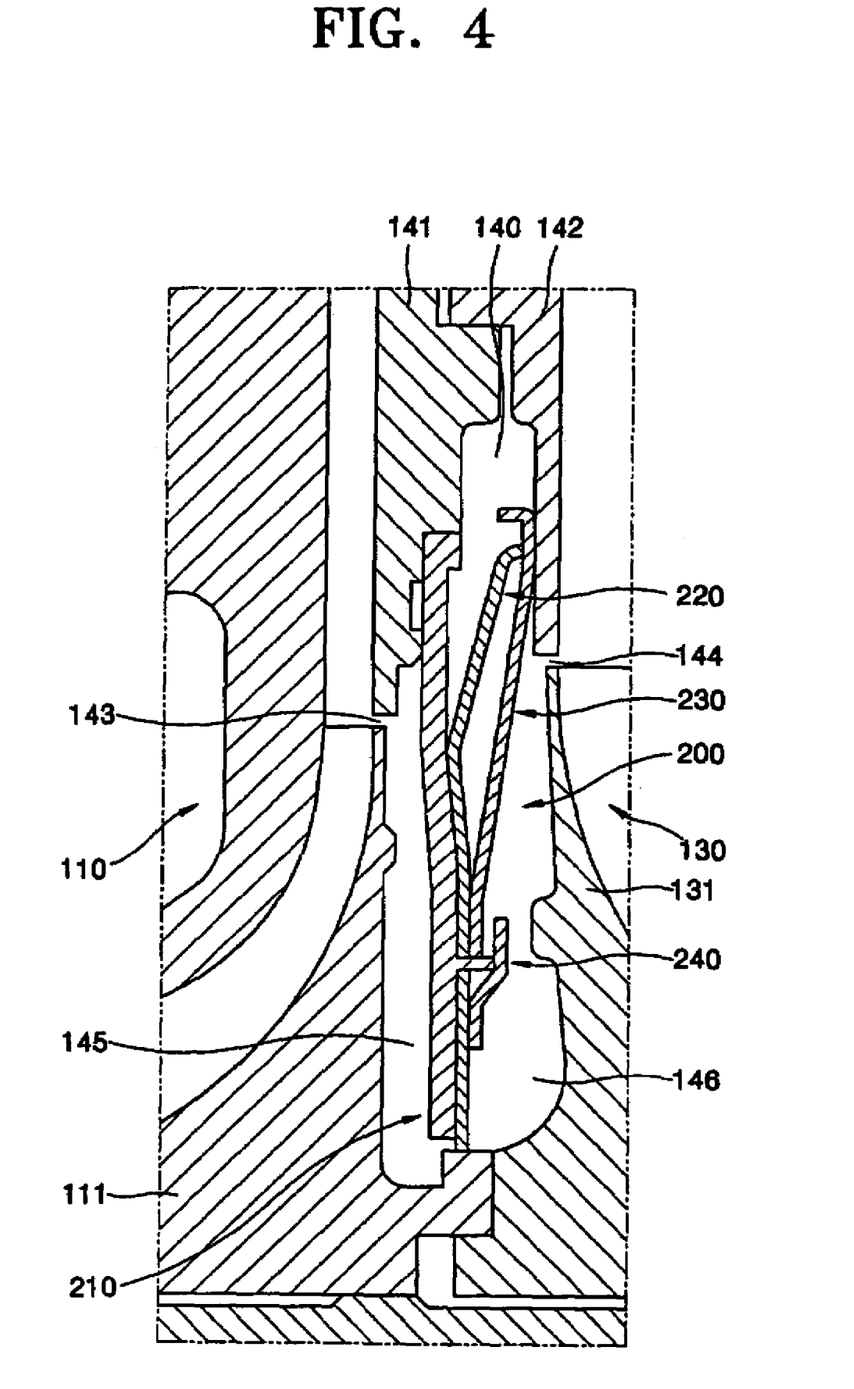
FIG. 4 is a longitudinal sectional view of the portion A of FIG. 3.

Referring to FIG. 4, an outer boundary of the plenum 140 is defined by a compressor section housing 141 and a turbine section housing 142, and an inner boundary thereof is defined by a compressor rotor 111 and a turbine rotor 131. It is noted that the term "housing" as used in "the compressor section housing" and "turbine section housing" is intended to broadly refer to any suitable frames or structures, and portions thereof, that enclose in any manner the particularly referred item (i.e., the compressor section or the turbine section), or that are formed within the enclosed area of the referred item, except the portions of the rotors 111 and 131.

Although the width of the plenum 140 is preferably as small as possible, if the width of the plenum 140 is excessively small, the plenum 140 cannot sustain an excessive thermal stress caused by a temperature difference of the working fluid between the compressor section 110 and the turbine section 130. Accordingly, the width of the plenum 140 should be appropriately designed considering integration of the engine and also effective endurance against the thermal stress.

In the plenum 140, the compressor section housing 141 and the compressor rotor 111 are hermetically sealed from each other and closely spaced apart from each other. However, there is a small gap between the outermost end of the compressor rotor 111 and the innermost end of the compressor housing 141, also between the outermost end of the turbine rotor 131 and the innermost end of the turbine housing 142. Thus, a narrow space between the compressor section housing 141 and the compressor rotor 111 forms a first fluid path 143, through which ambient air compressed by the compressor section 110 can flow to the plenum 140. Likewise, in the plenum 140 on the side of the turbine section 130, a similar narrow space maintained between the turbine section housing 142 and the turbine rotor 131 forms a second fluid path 144, through which a flow of high-temperature gas from the turbine section 130 can be received to the plenum 140. Thus, in order to restrain the air flow between the compressor section 110 and the turbine section 130 through the plenum 140, a seal assembly 200 is interposed in the plenum 140. The seal assembly 200 is formed of suitable metal, and includes an annular seal member 210 and an annular heat shield member 230 positioned between the seal member 210 and the turbine section 130.

Figure 5:
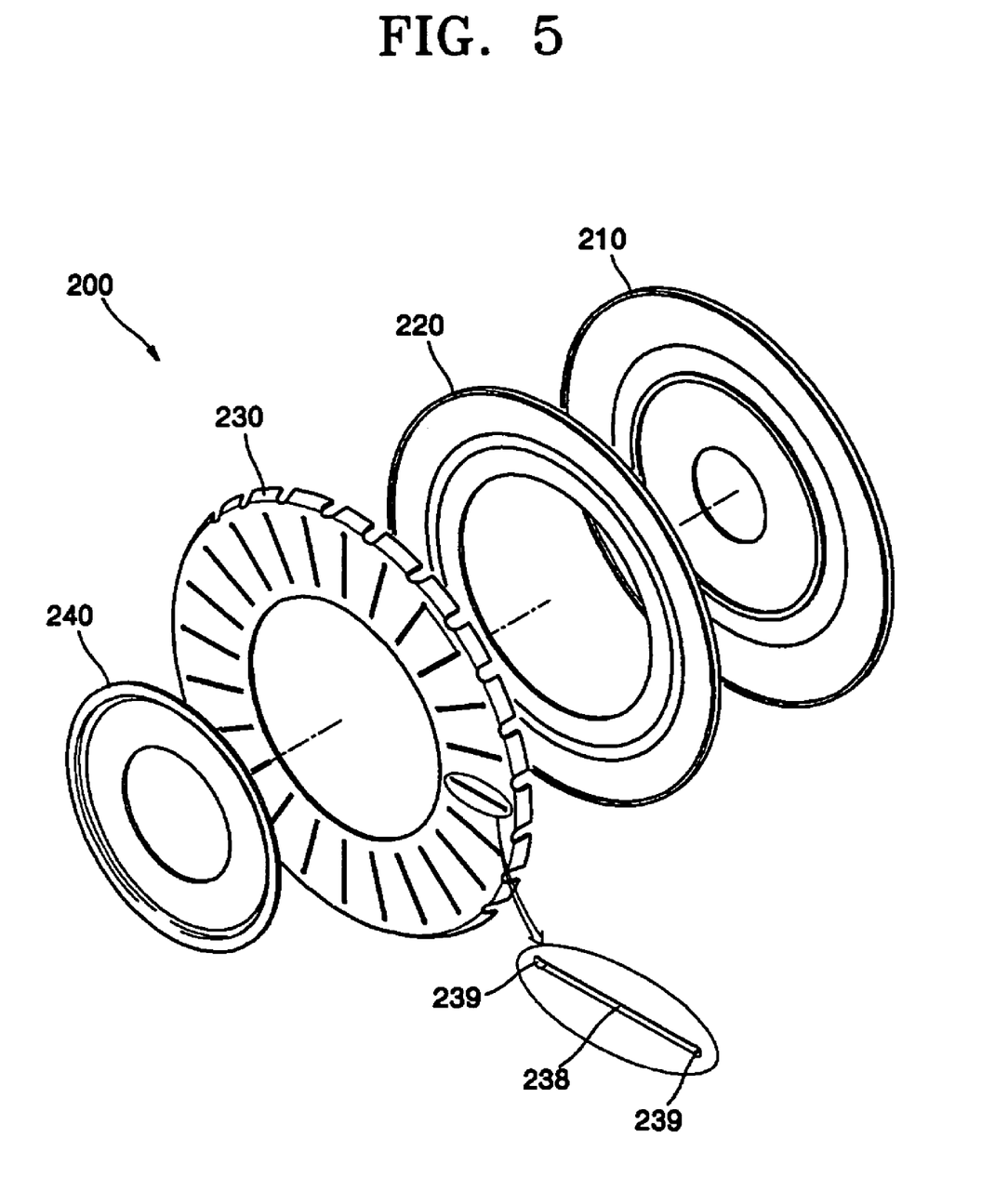
FIG. 5 is an exploded perspective view of the seal assembly of FIG. 3.
Figure 6:
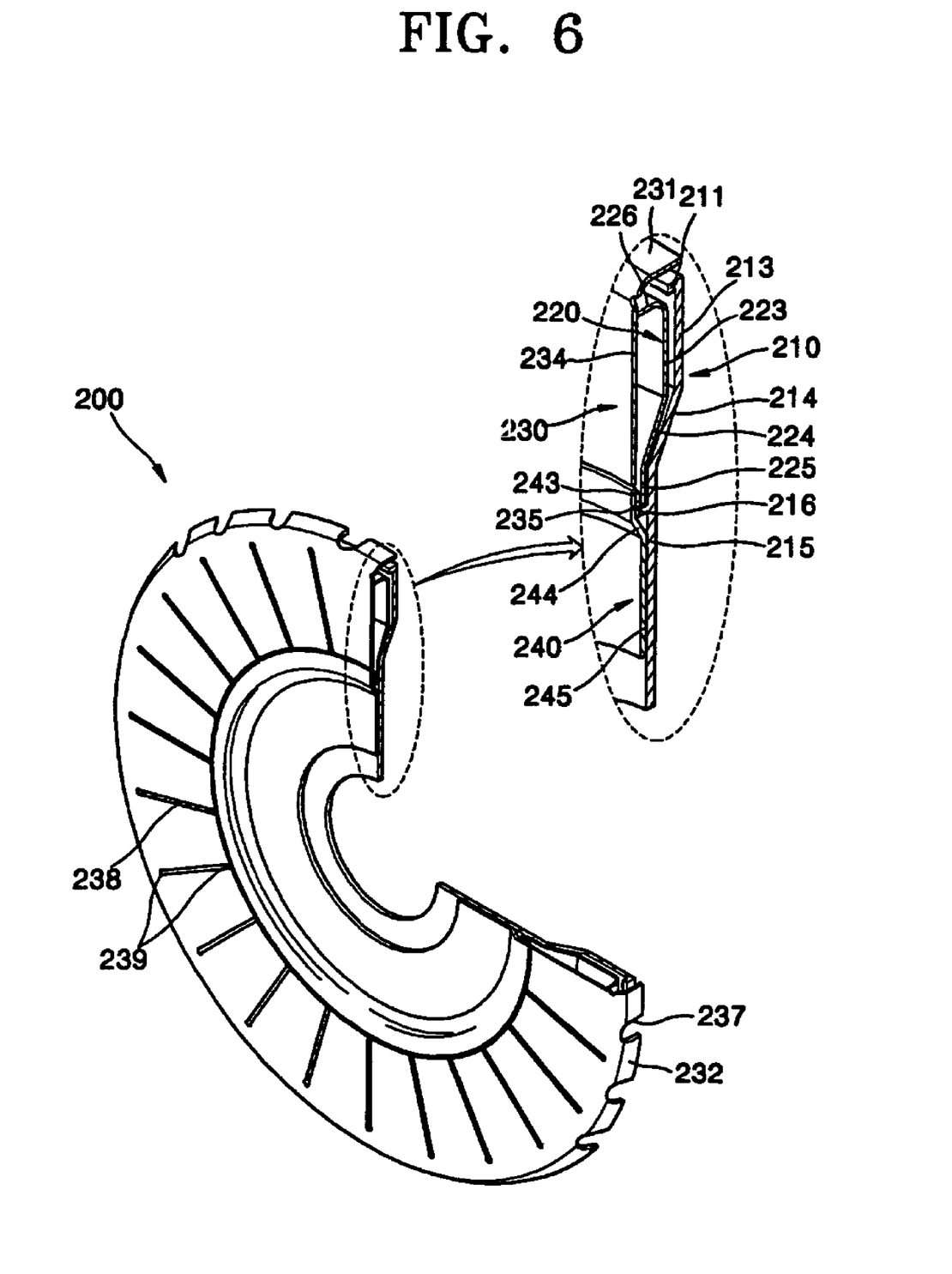
FIG. 6 is a perspective view of the seal assembly of FIG. 3 with a portion of the seal assembly cut away for illustration of its structure.

The seal member 210 is hermetically sealed to contact an inner circumference of the compressor section housing 141 and fixed to the compressor section housing 141. Referring to FIGS. 4–6, the seal member 210 is formed of an annular metal plate. A rim portion 211 of the seal member 210 is formed on an outer circumferential surface of the seal member 210 and protrudes toward the turbine section 130 by a predetermined length. An outer portion 213 of the seal member 210 (which is disposed on the side of the compressor section 110) extends radially towards the center of the seal member 210 from the marginal portion of the rim portion 211. An intermediate portion 214 of the seal member 210 extends radially toward the center of the seal member 210 from the outer portion 213, and bent at a predetermined angle from the edge portion of the outer portion 213. An inner portion 215 of the seal member 210 extends radially toward the center of the seal member 210 from the intermediate portion 214 and ends near the compressor rotor 111. Here, there is a very small gap between the terminal edge of the inner portion 215 and the compressor rotor 111. This fine gap can restrain the compressed air of the compressor section 110 from flowing to the plenum 140 but allows the air to flow along the nozzle leading the air to a desired place such as to a fuel cell stack (not shown). However, if the gap is designed to be excessively fine, the seal member 210 may contact and interfere with the compressor rotor 111 when the seal member 210 thermally expands due to the high-temperature air. Accordingly, the gap between the end of the inner portion 215 of the seal member 210 and the compressor rotor 111 needs to be appropriately designed in consideration of the operating state of the engine and thermal transformation of its components.

As details shown in FIG. 6, an elastic member 220 is positioned between the seal member 210 and the heat shield member 230, and closely pushes the heat shield member 230 against the turbine section housing 142. The elastic member 220 has an annular plate-like shape and functions as a spring. An intermediate portion 224 of the elastic member 220 is in contact with and supported by the intermediate portion 214 of the seal member 210. For that, the intermediate portion 224 of the elastic member 220 is set with an inclination by substantially the same angle as an angle by which the intermediate portion 214 of the seal member 210 is inclined. An outer portion 223 of the elastic member 220 radially extends with a predetermined length from the terminal edge of the intermediate portion 224. A bent portion 226 of the elastic member 220 extends from the edge of the outer portion 223 toward the turbine section 130. An inner portion 225 of the elastic member 220 radially extends from the inner edge of the intermediate portion 224, and is mounted at a support 216 which is projecting from the inner portion 214 of the seal member 210 toward the turbine section 130.

As such, the heat shield member 230 biases against, and thereby contacts hermetically with, the inner circumference of the turbine section housing 142. The heat shield member 230 has a generally annular plate-like shape, and is pressed by the bent portion 226 of the elastic member 220 to contact the turbine section housing 142. Below the pressed portion of the heat shield member 230, a slope portion 234 radially extends with an inclination toward the compressor section 110. An inner portion 235 radially extends from the edge of the slope portion 234 of the heat shield member 230 in a vertical direction towards the shaft 150, and a lower edge portion of the inner portion 235 is mounted on the support 216. A bent portion 231 of the heat shield member 230 extends toward the compressor section 110 from the upper end of the heat shield member 230. The bent portion 231 includes a plurality of groove portions 237 formed along the circumference thereof for relieving a thermal stress applied to the heat shield member 230. Thus, the bent portion 231 is generally composed of a plurality of discontinuous protrusions 232 along the outer circumference of the heat shield member 230.

The heat shield member 230 is formed of heat-resistant metal such as a nickel based alloy, stainless steel, or other suitable heat shield materials known in the art. According to one preferred embodiment of the invention, the heat shield member 230 has an outer diameter of about 200 millimeters, and a thickness of about 1 millimeter. However, the dimension of the heat shield member 230 may be varied depending on the particular types and specifications of the turbine engine to be applied.

In order to relieve the thermal stresses and prevent the thermal buckling and warping of the heat shield member 230 due to extended exposure to the high-temperature compressed gases flowing from the turbine section 130 (which is problematic in the conventional heat shield members), a plurality of narrow slots 238 are formed through along the outer face (i.e., on the slope portion 234) of the heat shield member 230. The slots 238 are preferably formed at regular intervals and arranged in a radial direction of the heat shield member 230 as shown in FIGS. 5 and 6. It is preferable that each of the slots 238 has a sufficient radial length covering substantially the entire area exposing to the hot gases of the turbine to effectively relieve the thermal stresses. Thus, the slots 238 extend generally from the outermost portion toward the innermost portion of the heat shield member 230. It is also preferable that each of the slots 238 has a width sufficiently narrow for limiting passage of the high-temperature compressed gases there-through. In use, the slots 238 can reduce concentration of thermal stresses in the heat shield member 230, and accordingly, thermal bucklings and cracks can be significantly reduced.

According to one preferred embodiment of the invention, the heat shield member 230 for application to a turbo charger coupled with a fuel cell system is formed of a nickel based superalloy such as hastelloy-x or In625, and has a thickness of about 1 millimeter and an outer diameter of about 200 millimeters. In this embodiment, preferably about ten (10) to fourteen (14) slots 238 of about 0.5 to 1 millimeter width are formed by a laser machining method known in the art. However, it is noted that the material and dimension of the heat shield member 230 and the dimension of the slots 238 can be varied depending on the particular applications and designs of the applicable turbine engine. The slots can be formed by laser machining, punching, precision milling, or other suitable machining or forming methods applicable to the particular material utilized.

Through holes 239 (FIG. 5) are formed at the heat shield member 230 at both end portions of the slots 238 to further relieve the thermal stress concentration at the terminal ends of the slots 238. In the present embodiment, since the slots 238 extend in the radial direction toward both of the marginal portions of the slope portion 234, the through holes 239 are also positioned at both of the marginal portions of the slope portion 234 where a relatively low temperature is maintained. The holes 239 have a diameter larger than the width of the slots 238. Thus, this slot and hole arrangement of the invention can effectively suppress development of creep, fatigue, or their interaction, and other damages caused from prolonged exposure to high temperature or stress, thus minimizing internal damage of the seal assembly 200 and extending the life span of the engine.

Figure 7A:
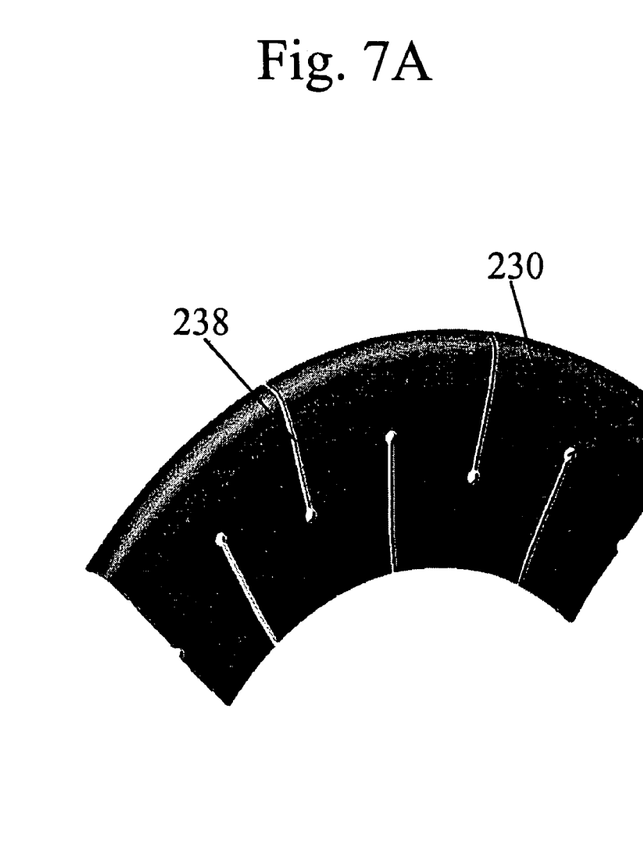
FIGS. 7A–7D are partial perspective views illustrating various embodiments of the heat shield member of the invention.
Figure 7B:
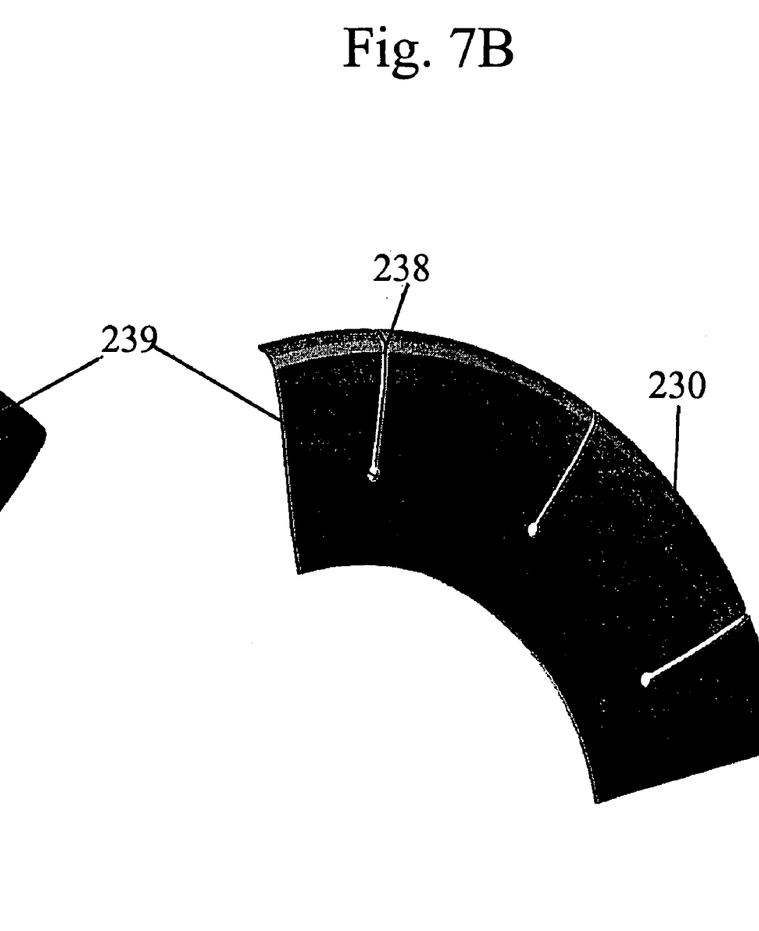
Figure 7C:
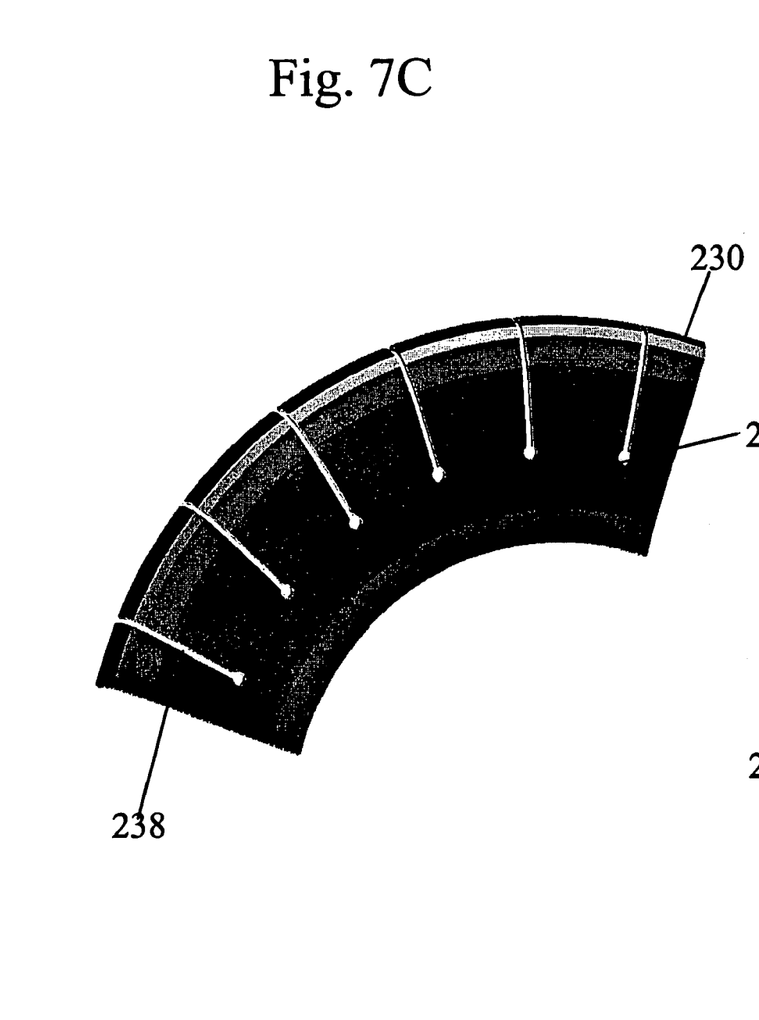
Figure 7D:
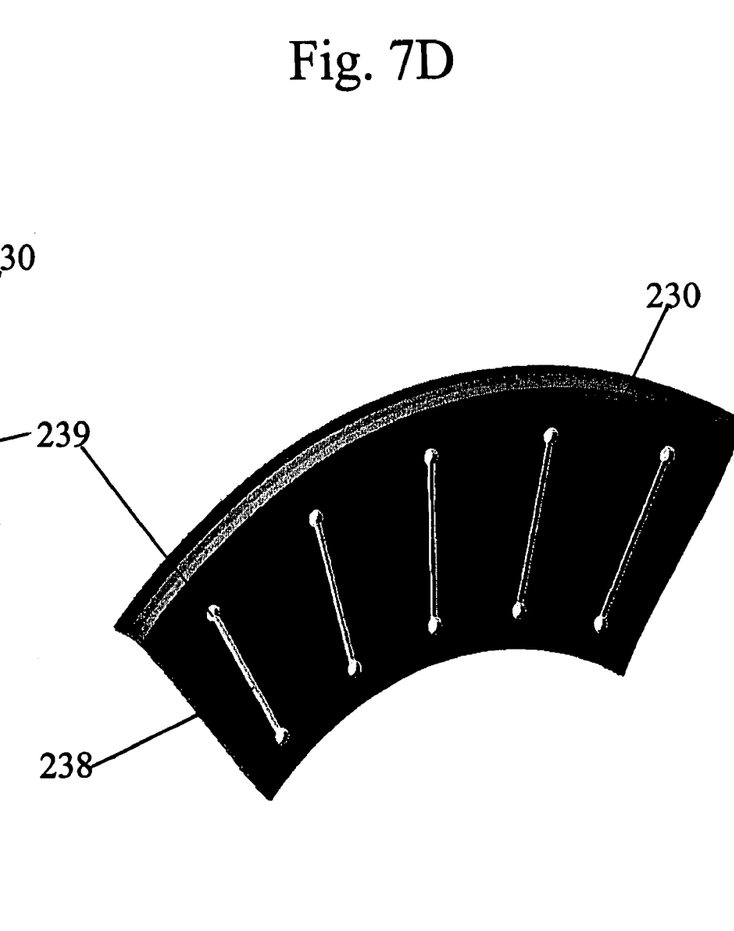

FIGS. 7A–7D illustrate several exemplary embodiments of the heat shield member of the invention wherein a plurality of, preferably more than ten, slots 238 are formed therein in a different pattern or dimension. As shown, each of the slots 238 can include through holes 239 formed at the two terminal ends thereof (FIG. 7D) or at one of the terminal ends (FIGS. 7A–7C).

Referring to FIGS. 4–6, a coupling member 240 is disposed between the heat shield member 230 and the turbine section 130. The coupling member 240 is formed of an annular metal plate and has an outer radius that is generally equal to the outer circumferential radius of the inner portion 235 of the heat shield member 230. Thus, an outer portion 243 formed at the outermost portion of the coupling member 240 closely contacts with the surface of the inner portion 235. An edge portion of the outer portion 243 extends in the radially inward direction and is inclined at a predetermined angle toward the compressor section 110, and coupled to a slope portion 244 of the coupling member 240. An edge portion of the slope 244 of the coupling member 240 is coupled to an inner portion 245 of the elastic member 220 extending in the vertical direction to the shaft 150.

A process for assembling the seal assembly 200 is described herein. The seal member 210, the elastic member 220, and the heat shield member 230 are sequentially placed in order and assembled together. Then, a contact portion between the coupling member 240 and the seal member 210 is welded, thereby completing the assembly of the seal assembly 200.

A process of driving the turbo charger 100 having the above-described structure and a process of sealing the turbo charger 100 using the seal assembly 200 is now described.

Referring to FIGS. 3 and 4, in the turbo charger 100, ambient air is supplied via an intake of the compressor section 110 and compressed by rotation of the compressor rotor 111. Then, the compressed air flows to a fuel cell stack (not shown). The compressed air with high-temperature comes from the fuel cell stack and flows to the turbine section 130, and rotates the turbine rotor 131. Here, a subsidiary combustor section (not shown) may be provided to raise the temperature of the air coming from the fuel cell stack.

Referring to FIG. 4, when the compressed air flows from the compressor section 110 toward the fuel cell stack, some of the compressed air flows to the plenum 140 via the first path 143 defined between the compressor rotor 111 and the compressor section housing 141. However, the outer portion 213 of the seal member 210 hermetically seals the compressor section housing 141 in a radially outer portion of the plenum 140 so that the compressed air is blocked from flowing into the turbine section 130.

As described above, the inner end of the inner portion 215 of the seal member 210 is slightly spaced apart from the compressor rotor 111, thereby limiting the fluid flow across the seal assembly 200 from the compressor section plenum 145 to the turbine section plenum 146 which is filled with compressed air. Also, since the outer portion of the heat shield member 230 and the inner lateral surface of the turbine section housing 142 are hermetically sealed, compressed air produced in the turbine section 130 cannot flow towards the compressor section 110 via the second path 144.

The high-temperature compressed air produced in the turbine section 130 collides against the heat shield member 230. As described above, because the slots 238 and the through holes 239 are formed in the heat shield member 230 to relieve the thermal stress, damage of the heat shield member 230 is prevented.

According to the present invention, the heat shield member includes a plurality of slots formed in the radial direction. Thus, even when the heat shield member contacts high-temperature gases produced from the turbine section, the thermal stress is relieved and damaging of the heat shield member can be reduced. In particular, the through holes formed in both ends of the slots greatly reduce the likelihood of breaking the slots due to concentration of the thermal stress.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. A gas turbine engine comprising:
   a turbine section having a turbine rotor;
   a compressor section having a compressor rotor, the compressor section positioned in a proximity of the turbine section;
   a plenum disposed between the turbine section and the compressor section, the plenum having first and second fluid paths adjacent to an outermost tip of the compressor rotor and the turbine rotor, respectively; and
   a seal assembly positioned in the plenum, the seal assembly including:
      an annular seal member positioned in the plenum adjacent to the compressor section for restraining a fluid flow between the compressor section and the turbine section via the first fluid path of the plenum; and
      an annular heat shield member positioned in the plenum adjacent to the turbine section for limiting heat transfer from the turbine section to the compressor section via the second fluid path of the plenum, the annular heat shield member including a plurality of slots formed in the heat shield member.

2. The gas turbine engine of claim 1, wherein each of the slots is disposed in a radial direction of the annular heat shield member.

3. The gas turbine engine of claim 1, wherein the seal assembly includes an elastic member positioned between the seal member and the heat shield member to bias the heat shield member to a turbine section housing of the gas turbine engine.

4. The gas turbine engine of claim 3, wherein the elastic member is a metal spring adapted to bias an outer end portion of the heat shield member to the turbine section housing.

5. The gas turbine engine of claim 3, wherein the seal assembly includes a coupling member attached thereto for connecting the seal member, the heat shield member, and the elastic member together.

6. The gas turbine engine of claim 3, wherein an outer end portion of the seal member is hermetically sealed at a compressor section housing of the gas turbine engine.

7. The gas turbine engine of claim 6, wherein an inner end of the seal member maintains a small gap with the compressor rotor.

8. The gas turbine engine of claim 1, wherein the heat shield member include a through hole formed in at least one end portion of each of the slots.

9. The gas turbine engine of claim 1, wherein the heat shield member is formed of heat-resistant metal.

10. The gas turbine engine of claim 9, wherein the heat shield member has a thickness of about 1 millimeter, and each of the slots has a width of between about 0.5 and 1 millimeter.

11. The gas turbine engine of claim 1, wherein the gas turbine engine is a turbo charger coupled with a fuel cell system.

* * * * *